United States Patent
Guo et al.

(10) Patent No.: US 11,334,600 B1
(45) Date of Patent: May 17, 2022

(54) PARTIAL RELOADING IN DATA SYNCHRONIZATION

(71) Applicant: International Business Machines Corporation, Armonk, NY (US)

(72) Inventors: Meng Guo, Beijing (CN); Zhang Xiaowei, Beijing (CN); Hao Zhang, Beijing (CN); Liang Lu, Beijing (CN); Jing F Fan, Beijing (CN); Jing Huang, Beijing (CN); Deng Ke Zhao, Beijing (CN); Daniel Martin, Leinfelden-Echterdingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/218,214

(22) Filed: Mar. 31, 2021

(51) Int. Cl.
*G06F 16/27* (2019.01)
*G06F 16/2455* (2019.01)
*G06F 16/28* (2019.01)
*G06F 16/248* (2019.01)
*G06F 16/2453* (2019.01)

(52) U.S. Cl.
CPC .......... *G06F 16/278* (2019.01); *G06F 16/248* (2019.01); *G06F 16/24542* (2019.01); *G06F 16/24554* (2019.01); *G06F 16/285* (2019.01)

(58) Field of Classification Search
CPC ............. G06F 16/278; G06F 16/24542; G06F 16/24554; G06F 16/248; G06F 16/285
USPC ........................................................ 707/737
See application file for complete search history.

(56) References Cited

U.S. PATENT DOCUMENTS

| 7,904,489 | B2 | 3/2011 | Grant | |
|---|---|---|---|---|
| 2010/0138442 | A1* | 6/2010 | Shinkawa | G06F 16/22 |
| | | | | 707/769 |
| 2012/0150791 | A1* | 6/2012 | Willson | G06F 16/254 |
| | | | | 707/600 |
| 2016/0210141 | A1* | 7/2016 | Gunti | G06F 9/4406 |
| 2017/0293530 | A1 | 10/2017 | Brodt | |
| 2019/0364105 | A1* | 11/2019 | Lou | G06F 3/0647 |
| 2020/0034365 | A1* | 1/2020 | Martin | G06F 16/2358 |
| 2020/0183908 | A1* | 6/2020 | Muralidhar | G06F 16/278 |

OTHER PUBLICATIONS

Du et al., "Clock-SI: Snapshot Isolation for Partitioned Data Stores Using Loosely Synchronized Clocks", printed on Mar. 26, 2021, 12 pages.

(Continued)

*Primary Examiner* — Hicham Skhoun
(74) *Attorney, Agent, or Firm* — Stephen R. Yoder

(57) ABSTRACT

Partial reloading of source data in data synchronization. Determining whether a source partition of source data in a source database is to be reloaded into target data in a target database, the source partition corresponding to a target partition of the target data. In accordance with a determination that the source partition is to be reloaded, one or more processors determine to load the source partition from the source database into the target database as a reference partition, the reference partition being separated from the target data in the target database and being assigned with a reference partition identity. In accordance with a determination that the loading of the source partition is completed, one or more processors determine to attach the reference partition to the target data.

20 Claims, 11 Drawing Sheets

(56) References Cited

OTHER PUBLICATIONS

Mell et al., "The NIST Definition of Cloud Computing", National Institute of Standards and Technology U.S Department of Commerce, Special Publication 800-145, Sep. 2011, 7 pages.
Stolze et al., "Partial Reload of Incrementally Updated Tables in Analytic Database Accelerators", (BTW 2019), 11 pages.

* cited by examiner

PARTIAL RELOADING IN DATA SYNCHRONIZATION

BACKGROUND

The present disclosure generally relates to database query techniques and more particularly, to a method, system, and computer program product for partial reloading in data synchronization.

Databases are computerized information storage and retrieval systems. The most prevalent type of database is the relational database, a tabular database in which data is defined so that it can be reorganized and accessed in a number of different ways. Another type of database is a distributed database that can be dispersed or replicated among different points in a network. Given the rapidly expanding volume of data under management, companies also continue to seek innovative techniques for managing data growth, in addition to protecting data. For instance, solutions providing data analysis capabilities, improved data presentation and access features, data synchronization, and the like, are in increasing demand.

SUMMARY

According to one embodiment of the present invention, there is provided a computer-implemented method. According to the method, one or more processors determine whether a source partition of source data in a source database is to be reloaded into target data in a target database, the source partition corresponding to a target partition of the target data. In accordance with a determination that the source partition is to be reloaded, one or more processors determine load the source partition from the source database into the target database as a reference partition, the reference partition being separated from the target data in the target database and being assigned with a reference partition identity. In accordance with a determination that the loading of the source partition is completed, one or more processors determine attach the reference partition to the target data.

According to a further embodiment of the present invention, there is provided a system. The system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
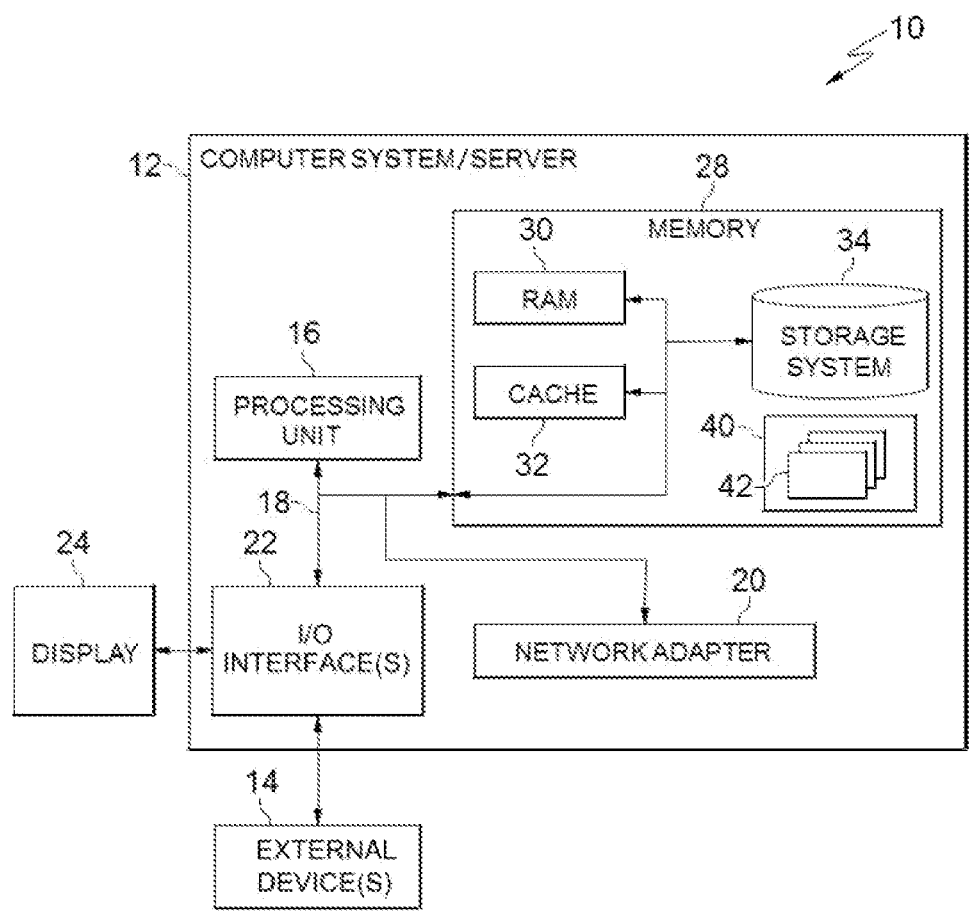
FIG. 1 depicts a cloud computing node according to some embodiments of the present disclosure.

Some embodiments of the present invention will be described in more detail with reference to the accompanying drawings, in which the embodiments have been illustrated. However, embodiments of the present invention can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
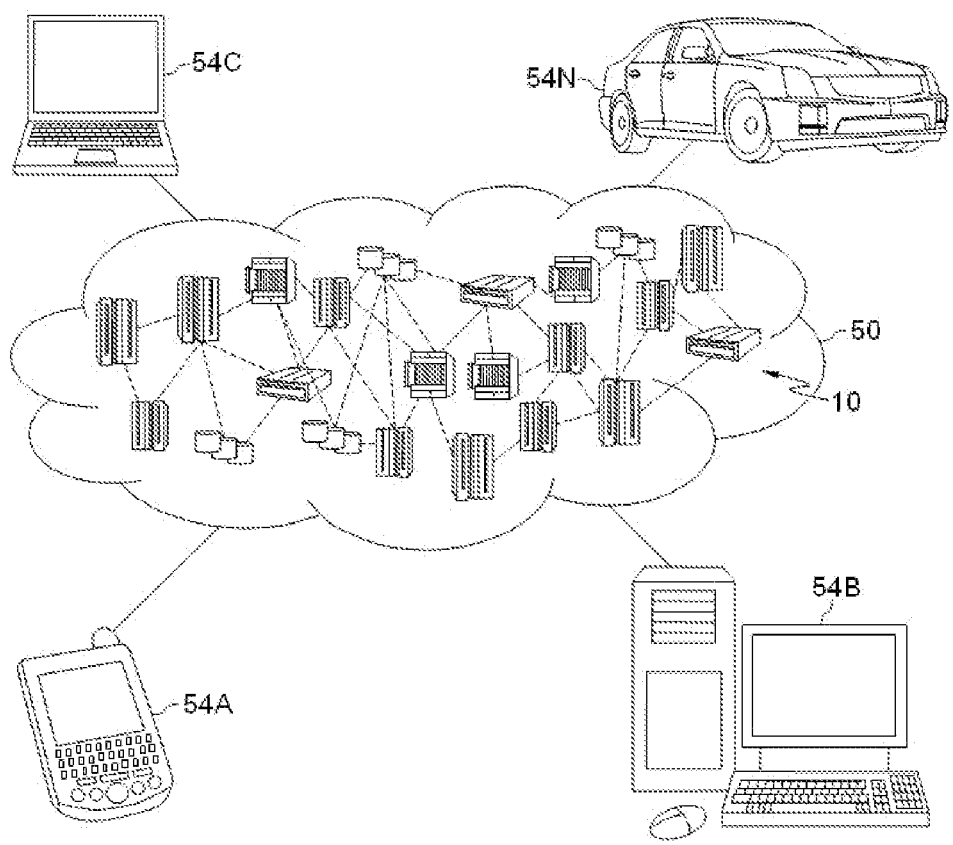
FIG. 2 depicts a cloud computing environment according to some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
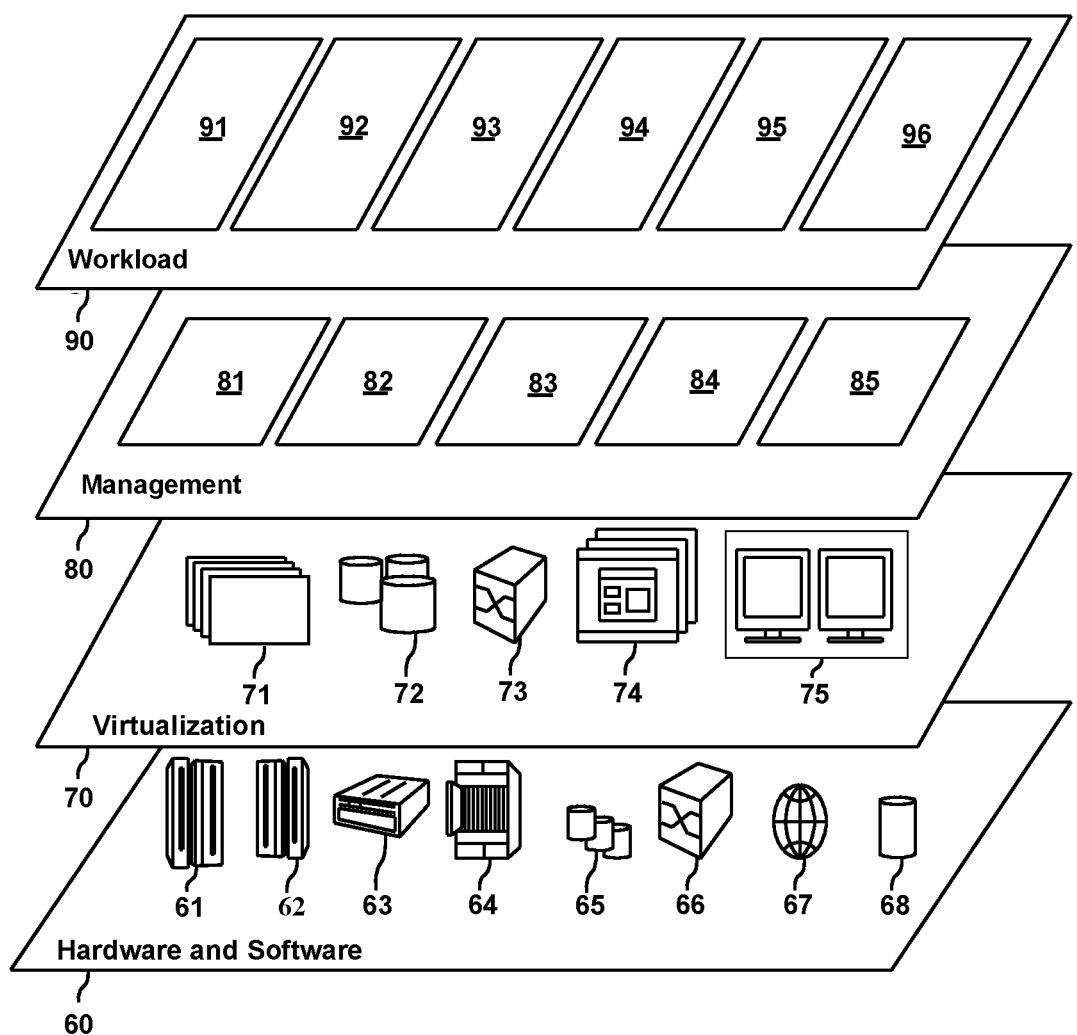
FIG. 3 depicts abstraction model layers according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and partial data reloading 96. The functionalities of partial data reloading 96 will be described in the following embodiment of the present invention.

Figure 4:
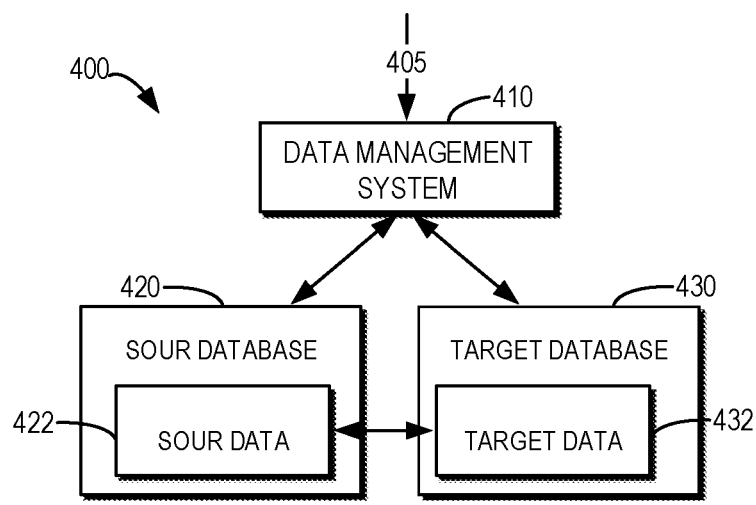
FIG. 4 depicts a block diagram of a database environment according to some embodiments of the present disclosure.

FIG. 4 illustrates a block diagram of a database environment 400. In the environment 400, a data management system 410 is configured to perform data management on a source database 420 with source data 422 stored therein and a target database 430 with source data 432 stored therein. Typically, the two databases may build on massive storage devices. The databases may be any suitable type of databases, including a relational database or non-relational database. In some scenarios, the source data 422 is also called as a source data table, and the target data 432 is also called as a target data table.

In some embodiments, the data management system 410 may be implemented by computer system/server 12 of FIG. 1 or by multiple computer systems/servers in a distributed manner. In particular, the data management system 410 supports operations on the databases 420 and 430.

Initially, the target data 432 is loaded from the source data 422. One or more users may operate on the source data 422, and at least a part thereof may be changed. For example, more data entries may be added to the source data 422, some data entries of the source data 422 may be deleted or modified. It is expected that the target data 432 is synchronized with the source data 422.

Since the source data 422 may be of large size, to perform synchronization of the source data 422 and the target data 432, it is possible to perform partial reloading. To perform partial reloading, the source data 422 and the target data 432 are each divided into a plurality of partitions. The dividing of the partitions may be performed according to various criteria as required in different applications. For example, for a data table recording user account information from all over the country, a partition of the data table may include user account information from a province of the country. The partial reloading mechanism allows refreshing some partitions of the source data 422 into the target data 432, which is more convenient and time-efficient.

During operation, in order to access, retrieve, and process the stored target data 432, a query 405 is generated, automatically or manually. The term "query" refers to a set of commands for retrieving data from a stored database. In the case of a relational database, the standard protocol is the structured query language (SQL), and thus the query 405 is a SQL query. SQL is used for interactive queries to access the data in the database, in order to select, insert, update, find out the location of data in a database, and so forth. The data management system 410 receives and processes the query 405 in order to execute it.

Figure 5:
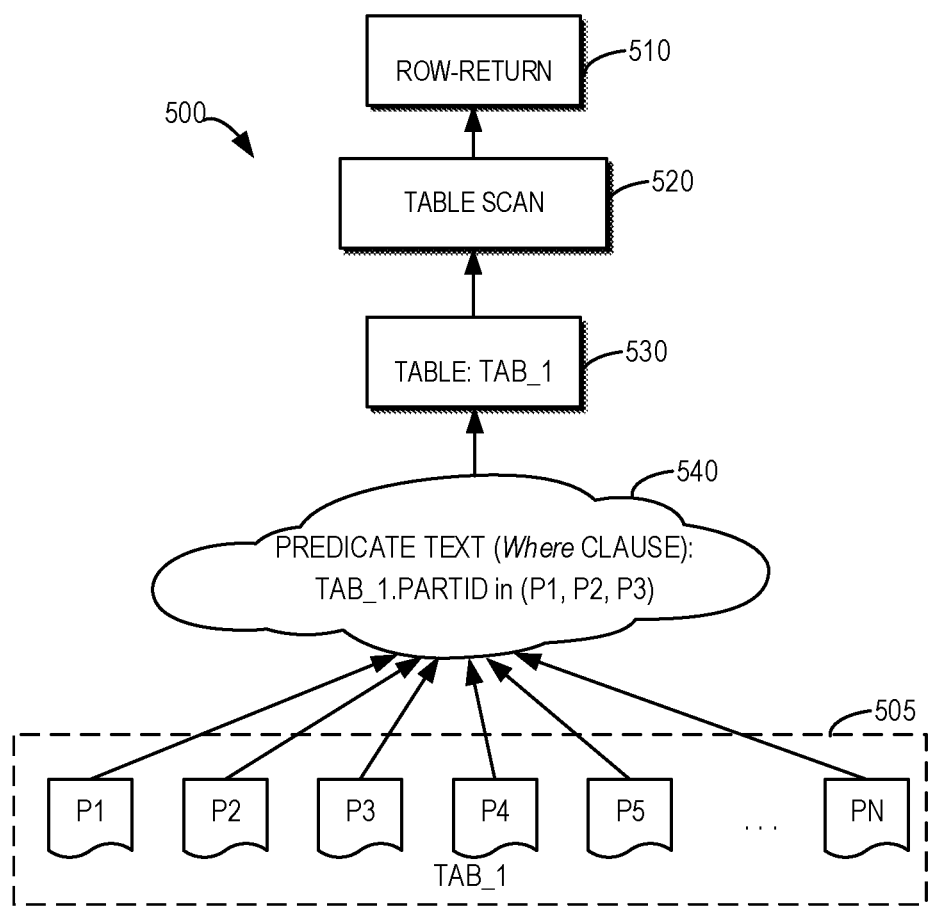
FIG. 5 depicts an example conventional process of access to target data with a plurality of partitions.

Generally, to access data in a database, the data management system may define a "view" to capture a part of target data to be accessed. Currently, a view is defined by a where clause which specifies the column name in the target data as the query condition. In order to access one or more partitions of the target data, the data management system may determine one or more column names in the one or more partitions to be accessed and generate the corresponding where clause. The data management system may use a predicate language for the where clause. FIG. 5 illustrates an example conventional data access process 500 to target data with a plurality of partitions. It is assumed that target data 505 includes partitions P1, P2, P3, P4, P5, . . . , PN, and a query is received to access data in partitions P1, P2, and P3.

During the data access process, to generate an execution plan for the predicate execution langue, it is not possible to exclude other partitions such as partitions P4, P5, . . . , PN from the execution plan. Thus, all the partitions of the target data 505 are locked and an operation of "Table_Scan" 520 is executed to scan all the target data 505 by identifying the identity of the target data in operation "TABLE: TAB_1" 530. The scan operation is executed to find the column names corresponding to the desired partitions P1, P2, and P3. After the operation of "Table_Scan," the found column names are returned as a response to the query, via an operation of ROW_RETURN" 510.

Currently, to perform the partial reloading, one or more partitions of the target data are first deleted and corresponding partitions of the source data are copied and inserted into the target data in the target database.

The partial reloading may replace all data of one or more specified partitions into the target data. At the same time, concurrent queries are possible on the target data. Those queries need run with snapshot isolation semantics as it is desired that the customers initiating the queries can see the data entirely either before or after the partial reloading.

Although the partial reloading is more time-efficient as compared with the full reloading, as the data volume become larger and larger, the partial reloading elapsed time may become longer and longer. In some cases, the execution of the queries may have to be stopped during the partial reloading process because old-of-date data are needed to be deleted at the beginning of the process. Further, there may be impacts existing between cleaning up out-of-date data and concurrent customers' queries on the same target data.

Therefore, there is a need for effective partial reloading in data synchronization.

According to example embodiments of the present invention, or present disclosure, there is a proposed solution for effective data access. In this solution, instead of copying a source partition from source data and inserting the copied data to target data, the source partition is loaded from the source database and stored in a target database separately from the target data. The source partition is stored as a reference partition in the target database. After the loading is completed, the reference partition is attached to the target data. The partial reloading process, which may take a certain period of time, will have no impact on the queries to the target data because the loading partition is separated from the target data. Further, unlike the inserting operation, the attaching operation will not cause a commit impact on the target database because no rollback is needed for the attaching operation.

Other advantages of the present disclosure will be described with reference to the example embodiments and the accompanying drawings below.

Figure 6A:
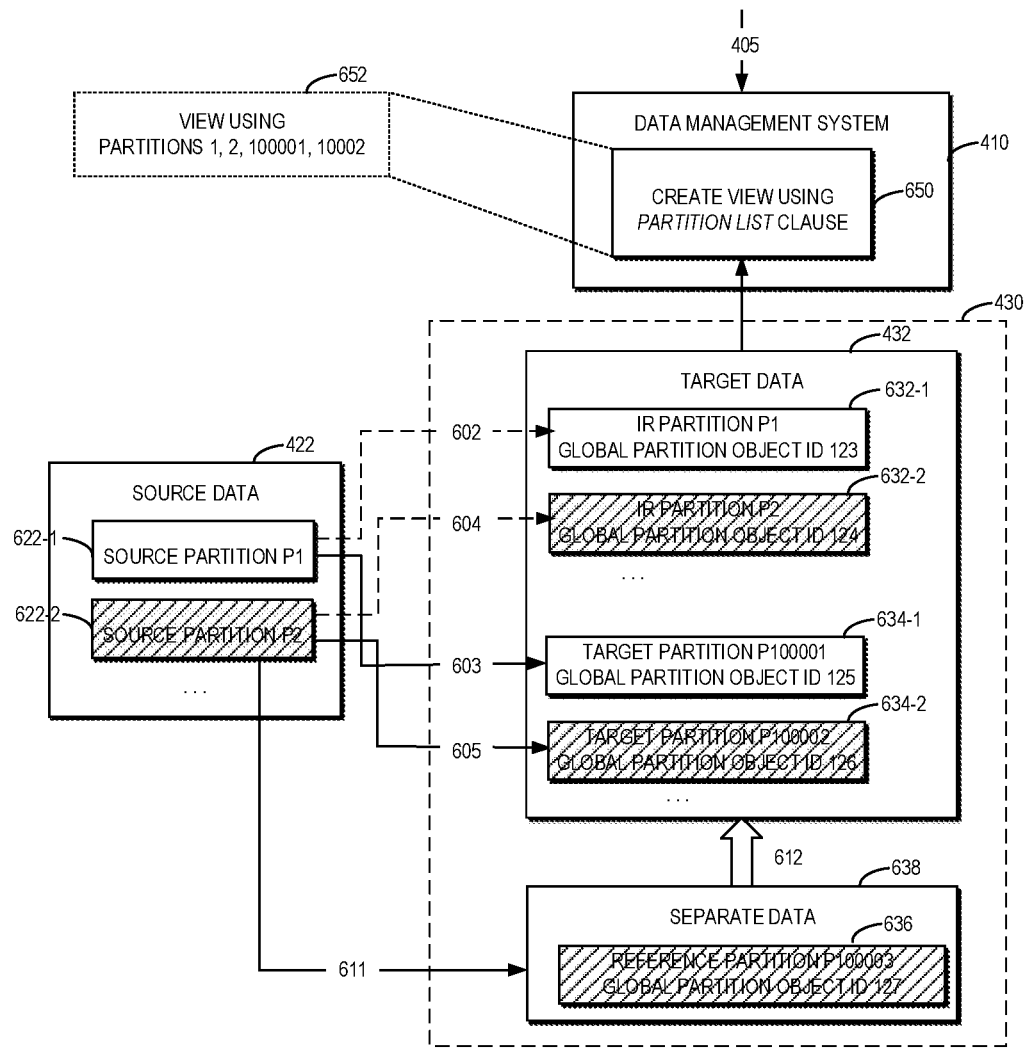
FIGS. 6A-6D depicts an example environment in which partial reloading of some embodiments of the present disclosure are implemented.

Reference is first made to FIG. 6A, which illustrates an example environment in which partial reloading of some embodiments of the present disclosure are implemented. For the purpose of illustration, the environment of FIG. 6A is evolved from the environment 400 in FIG. 4. FIG. 6A illustrates some embodiments of partial reloading from the source data 422 to the target data 432. Further reference will be made to FIGS. 6B, 6C, and 6D to illustrate further example operations during partial reloading To better illustrate the embodiments of the present disclosure, as shown in FIG. 6A, the source data 422 in the source database 420 includes a plurality of source partitions such as a source partition 622-1 (denoted as P1), a source partition 622-2 (denoted as P2), and so on. The target data 432 in the target database 430 includes a plurality of target partitions corresponding to the source partitions of the source data 422. Specifically, the target data 432 includes a target partition 634-1 (denoted as P100001) corresponding to the source partition 622-1, a target partition 634-2 (denoted as P100002) corresponding to the source partition 634-2, and so on.

It would be appreciated that the number of source partitions and target partitions in FIG. 6A are provided example, and the source data and target data may include other numbers of partitions. For convenience of discussion, the source partitions 622-1, 622-2 may be collectively or individually referred to as source partitions 622, and the target partitions 634-1, 634-2 may be collectively or individually referred to as target partitions 634.

The target partitions in the target database 430 may be previously loaded from the source data 422 through all possible manners. For example, in an initial stage, the source data 422 may be fully loaded from the source database 420 to the target database 430. In such case, the target partition 634-1 is loaded 603 from the source partition 632-1, and the target partition 634-1 is loaded 605 from the source partition 632-2, and so on. In some other examples, the target partitions 634 may be loaded through a partial reloading process.

In some embodiments, the target database 430 may further includes respective incremental replication (IR) partitions corresponding the target partitions, including an IR partition 632-1 corresponding to the target partition 634-1, an IR partition 632-2 corresponding to the target partition 634-2, and so on. For convenience of discussion, the IR partitions 632-1, 632-2 may be collectively or individually referred to as IR partitions 632. The respective IR partitions 632 stores incremental data for the target partitions 634 through an incremental replication process. For example, after the target partitions 634 are loaded from the source partitions 632, the source partitions 632 stored in the source database 420 may be updated with incremental data.

The incremental data corresponding to each source partition 622 may be loaded into the IR partitions 632. For example, incremental data in the source partition 622-1 is loaded 602 into the IR partition 632-1, incremental data in the source partition 622-2 is loaded 604 into the IR partition 632-2, and so on. As such, an IR partition 632 and a target partition 634 can include the latest data in a corresponding source partition 622.

During operation, a partial reload process may be initiated, trying to reload a source partition 622 of the source data 422 in the source database 420 to the target database 640. The partial reloading may be triggered for various reasons. For example, the partial reloading may be triggered periodically, in response to some events, or manually by the operators.

The partial reloading is to reload all data in a source partition 622-2 (instead of the incremental data only) to the target data 432 in the target database 430, in order to maintain data synchronization between the partitions of the source data 422 and the target data 432. During a partial reloading processed, one, some, or all of the source partitions 622 of the source data 422 may be reloaded to the target data 432. In the example of FIG. 6A, it is assumed that a source partition 622-2 is to be reloaded into the target database 430. The partial reloading of the source partition 622-2 is described in detail and the partial reloading of other source partitions may be performed in a similar way.

According to the embodiments of the present disclosure, the partial reloading may be implemented at the data management system 410. If the data management system 410 determines to reload the source partition 622-2 to the target data 432, the data management system 410 loads 611 the source partition 622-2 from the source database 420 to the target database 430 as a reference partition 636. The source partition 622-2 is corresponding to the target partition 634-2. The reference partition 636 is to be loaded to the target database 430 as separate data 438, stored separately from the target data 432. For example, the target data 432 is stored as a target data table and the reference partition 636 is stored as a separate data table.

The loading of the source partition 622-2 from the source database 420 to the target database 430 may take some time. The time lapse of the loading may depends on the size of the source partition 622-3 among others. If the loading of the source partition is completed, which means that data in the source partition 622-2 has been completely stored in the target database 430, the data management system 410 attaches 612 the reference partition 636 to the target database 430, for example, through an "attach" operation provided by the target database 430. As the reference partition 636 has been stored in the target database, the attaching operation can be completed quickly. In addition, unlike the inserting operation, the attaching operation will not cause a commit impact on the target database because no rollback is needed for the attaching operation.

During the loading of the source partition 622-2, the data management system 410 may respond to the queries involving the target data 432 normally, including the queries involving the target partition 634-2 which corresponds to the source partition 622-2. This target partition 634-2 is remained in the target data 432 without changes. That is, the loading of the source partition 622-2 will not impact on the performance to the queries.

Specifically, in some embodiments of the present disclosure, there is proposed a solution for the execution of queries. The partitions of the target data 432 are each assigned with respective partition identities. As illustrated in FIG. 6A, the target partition 634-1 is assigned with a partition name "P100001" and a global partition object identity "125." The partition name may distinguish the target partition 634-1 from other partitions in the target data 432, and the global partition object identity may distinguish this partition from all the other partitions stored in the target database 430. Similarly, the target partition 634-2 is assigned with a partition name "P100002" and a global partition object identity "126." The IR partition 622-1 is assigned with a partition name "P1" and a global partition object identity "123" and the IR partition 622-2 is assigned with a partition name "P2" and a global partition object identity "124."

The partition identities of the partitions may enable the data management system 410 to perform access to the respective partitions of the target data, without locking the all the target data during the access to a part thereof. From the applications issuing queries to one or more partitions of the target data 432, the partitions of the whole target data 432 may be viewed through a list of its partitions identified with their partition identities. For example, the data management system 410 may create a view using partition list clause 650. A view 652 may be presented with one or more partitions of the target data 432, such as partitions 1, 2, 100001, and/ 100002.

Specifically, during the loading of the source partition 622-1, if the data management system 410 receives a query 405 to at least the target partition 634-2, the data management system 410 may generate an execution plan for the query 405. In the execution plan, the target partition 643-1 may be identified with its target partition identity, including "P100001" and/or "126." In some embodiments, to access the latest data, the execution plan for the query 405 may further identify the IR partition 632-2 with its partition identity "P1" and/or "124."

In some embodiments, if the target database 430 supports accessing the target data by creating a view, the execution plan may define a view associated with the target partition 634-2 by identifying the target partition 634-2 with the target partition identity "P100001" and/or "126." In some cases, the view may be further defined by identifying the corresponding IR partition 632-2 with its partition identity "P1" and/or "124." By executing the execution plan, the target partition 634-2 and its IR partition 632-2 may be locked and scanned during the access. The data to be queried in the target partition 634-2 and its IR partition 632-2 may be found and returned as a response to the query 405.

It is noted that if the query 405 involves one or more partitions other than the target partition 634-2, the execution plan may define the view by identifying the one or more other partitions in a similar way.

Figure 7:
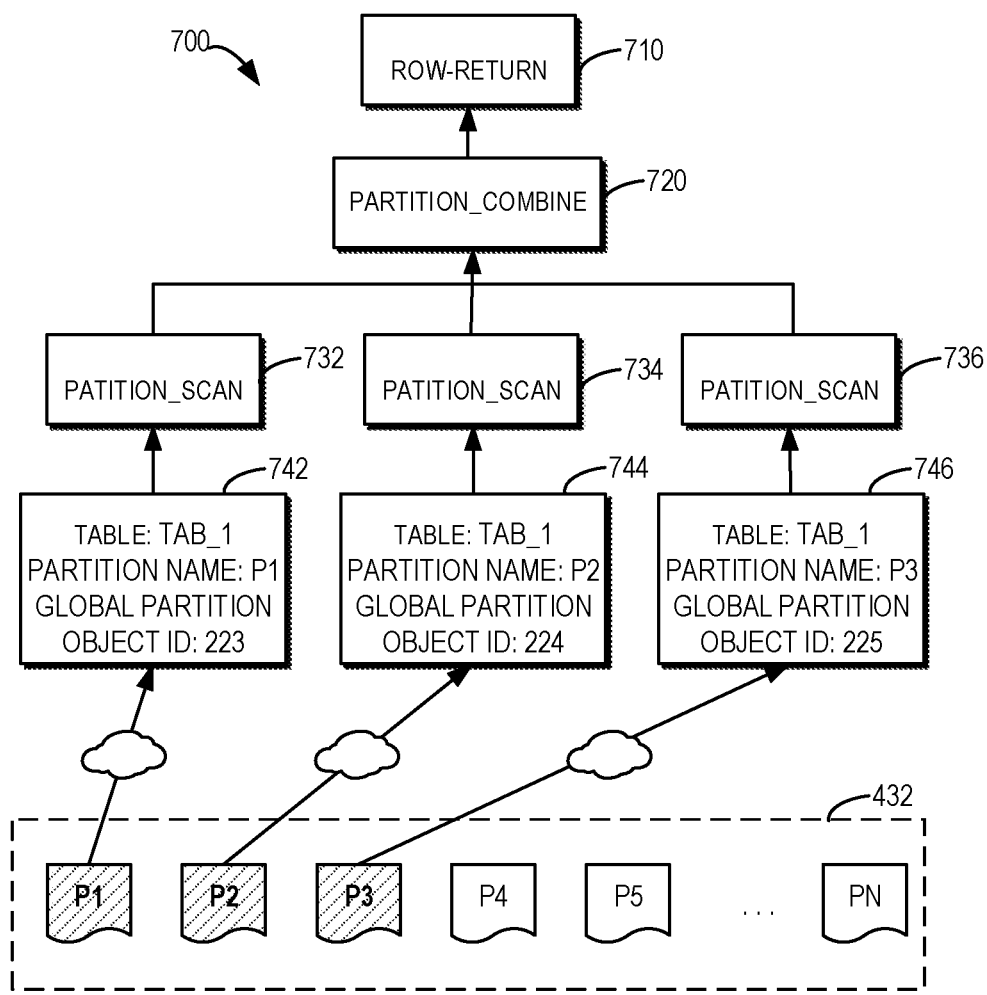
FIG. 7 an example of query execution according to some embodiments of the present disclosure.

FIG. 7 illustrates an example of query execution according to some embodiments of the present disclosure. In this example, it is assumed that the target data 432 includes partitions P1, P2, P3, P4, P5, . . . , PN (more partitions than those shown in FIG. 6A), and a query is received to access data in partitions P1, P2, and P3 of the target data. The data management system 410 may generate an execution plan for this query by creating a view to identify partitions P1, P2, and P3 with their identities (with partition names P1, P2, P3, and global partition object identities 223, 224, 225 in the example of FIG. 7). Clauses 742, 744, 746 are executed to identify partitions P1, P2, and P3, and operations of "Partition Scan" 732, 734, 736 are performed to find data in partitions P1, P2, and P3 that are to be searched in the current query. The results from partitions P1, P2, and P3 are combined through an operation of "Partition_Combine"

720. The column names in the partitions P1, P2, and P3 are returned as a response to the query, via an operation of ROW_RETURN" 710.

Through the above execution plan, the partitions in the target data 432 can be accessed normally during loading of the source partition 622 and even during the attaching of the reference partition 636. To support the queries to the reference partition 636, the reference partition 636 is also assigned with a reference partition identity, such as a partition name "P100003" and/or a global partition object identity "127."

Figure 6B:
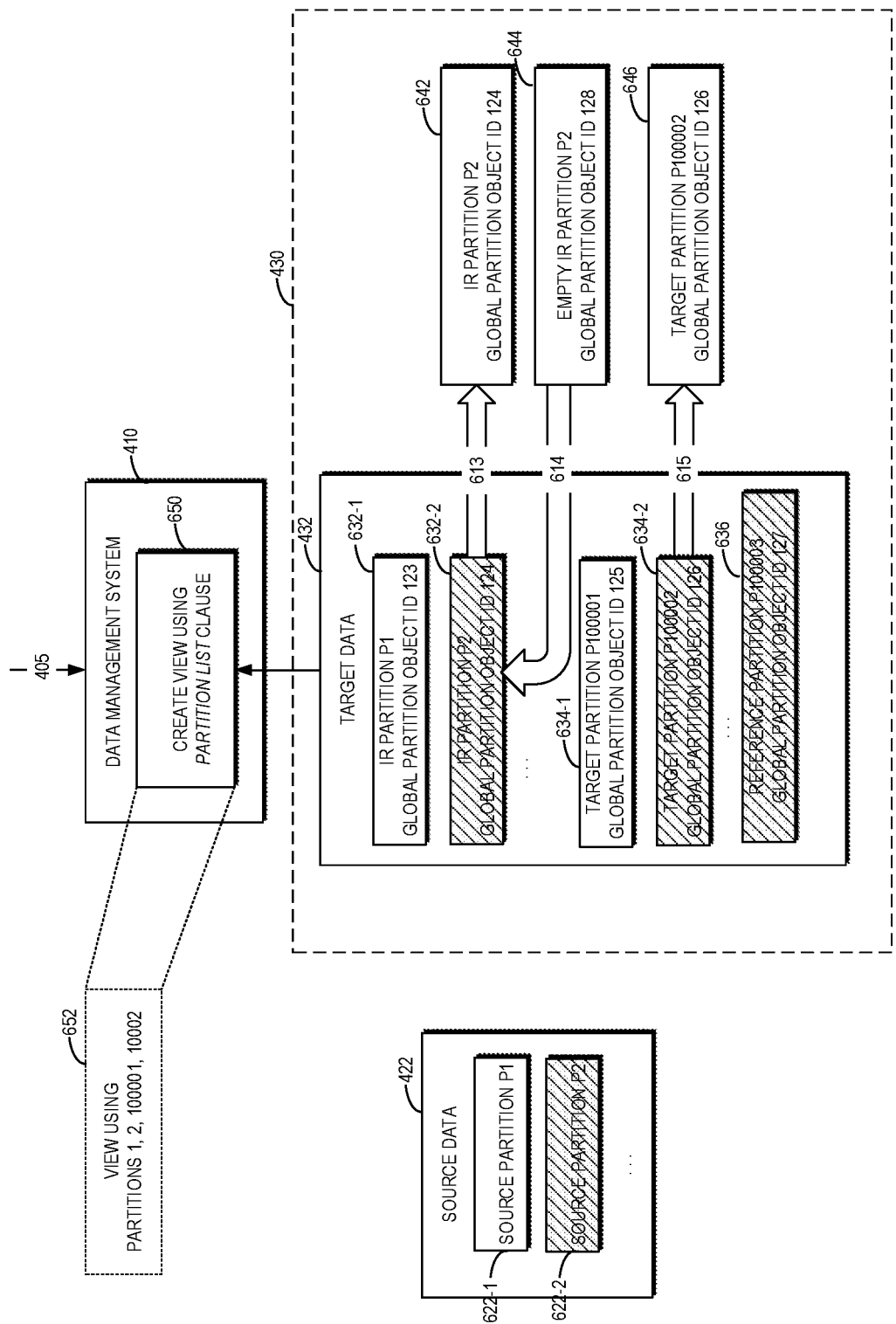

After the reference partition 636 is attached to the target data 432, it is expected to remove old data from the target data 432. Reference is made back to FIG. 6B, which illustrates that the reference partition 636 is included in the target data 432. The data management system 410 may detach 613 the IR partition 632-2 corresponding to the target partition 634-2 from the target data 432, for example, through a "detach" operation provided by the target database 430. The incremental data stored in the IR partition 632-2 has been incorporated in the reference partition 636 which is loaded from the source database 420 and thus may be removed now.

Through the detaching operation, a copy 642 of the IR partition 632-2 is generated and stored separately from the target data 432. For example, the copy 642 of the IR partition 632-2 may be stored as a separate data table in the target database 430. The copy 642 of the IR partition 632-2 may inherit the partition identities of the IR partition 632-2.

In addition to the detaching of the IR partition 632-2, the data management system 410 may further an empty IR partition 644 in the target database 430, which is assigned with a further partition identity, such as a partition name "P2" and a new global partition object identity "128." It is noted that the same partition name "P2" as the IR partition 632-2 can be used because the IR partition 632-2 is detached from the target data 432. The data management system 410 may then attach 614 the empty IR partition 644 to the target data 432 to store following incremental data for the reference partition 636 (which is corresponding to the source partition 622-2 in the source data 422).

In some embodiments, the data management system 410 may further detach 615 the target partition 634-2 from the target data 432, for example, through a "detach" operation provided by the target database 430. Through the detaching operation, a copy 646 of the target partition 634-2 is generated and stored separately from the target data 432 in the target database 430. For example, the copy 646 of the target partition 634-2 may be stored as a separate data table in the target database 430. The copy 646 of the target partition 634-2 may inherit the partition identities of the target partition 634-2.

Figure 6C:
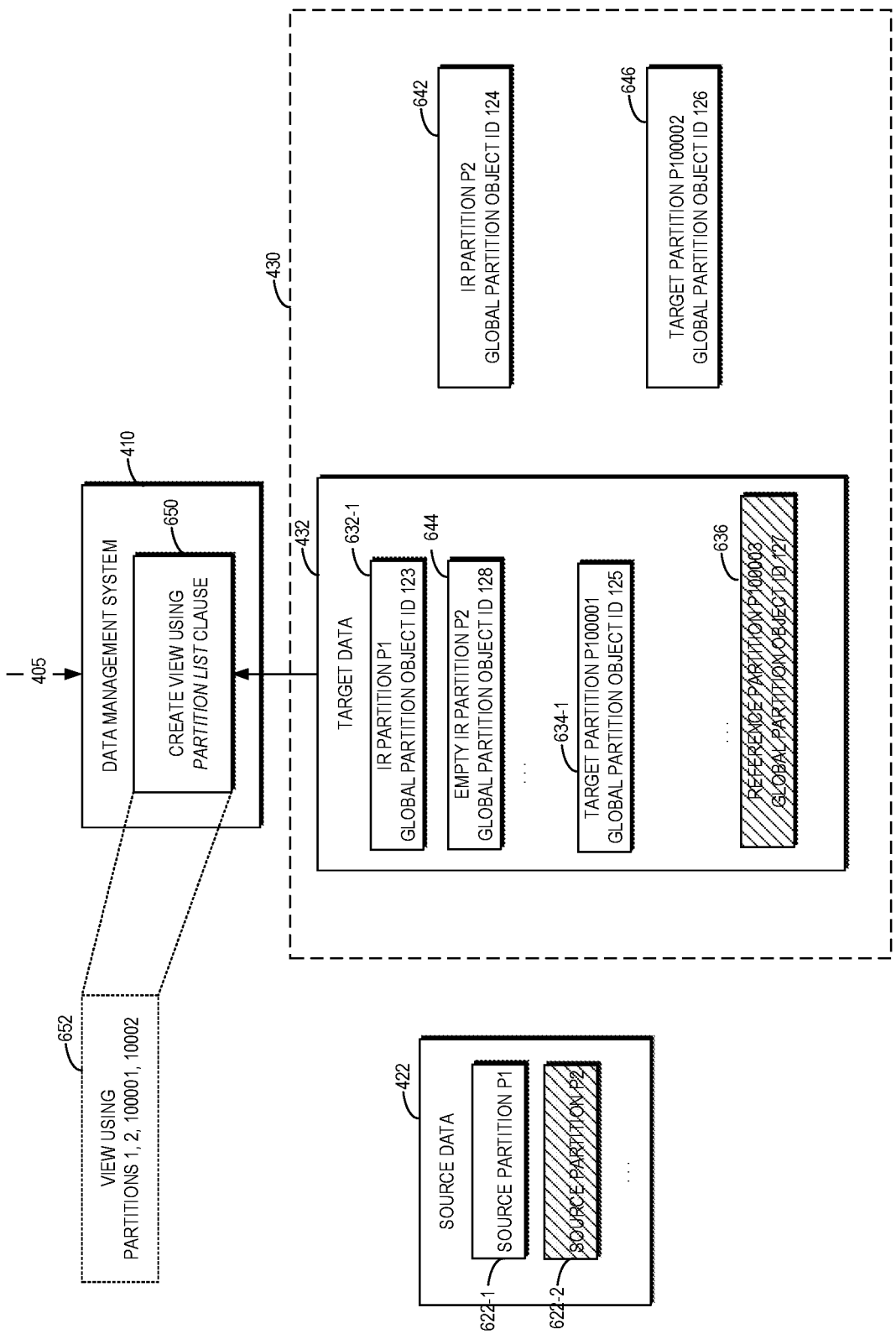

Through the above detaching and attaching process, the data in the target database 430 may be as illustrated in FIG. 6C. By providing the copy 642 of the IR partition 632-2 and the copy 646 of the target partition 634-2 after the reference partition 636 is included to the target data 432, it is possible to support pending queries which address to the IR partition 632-2 and the target partition 634-2. For example, the data management system 410 may determine whether there is a pending execution plan identifying the target partition 634-2 with the target partition identity "P100002" and "126" and/or identifying the IR partition 632-2 with the target partition identity "P2" and "124." If there is such a pending execution plan, the copy 642 of the IR partition 632-2 and the copy 646 of the target partition 634-2 may be accessed to provide the response to the query.

Figure 6D:
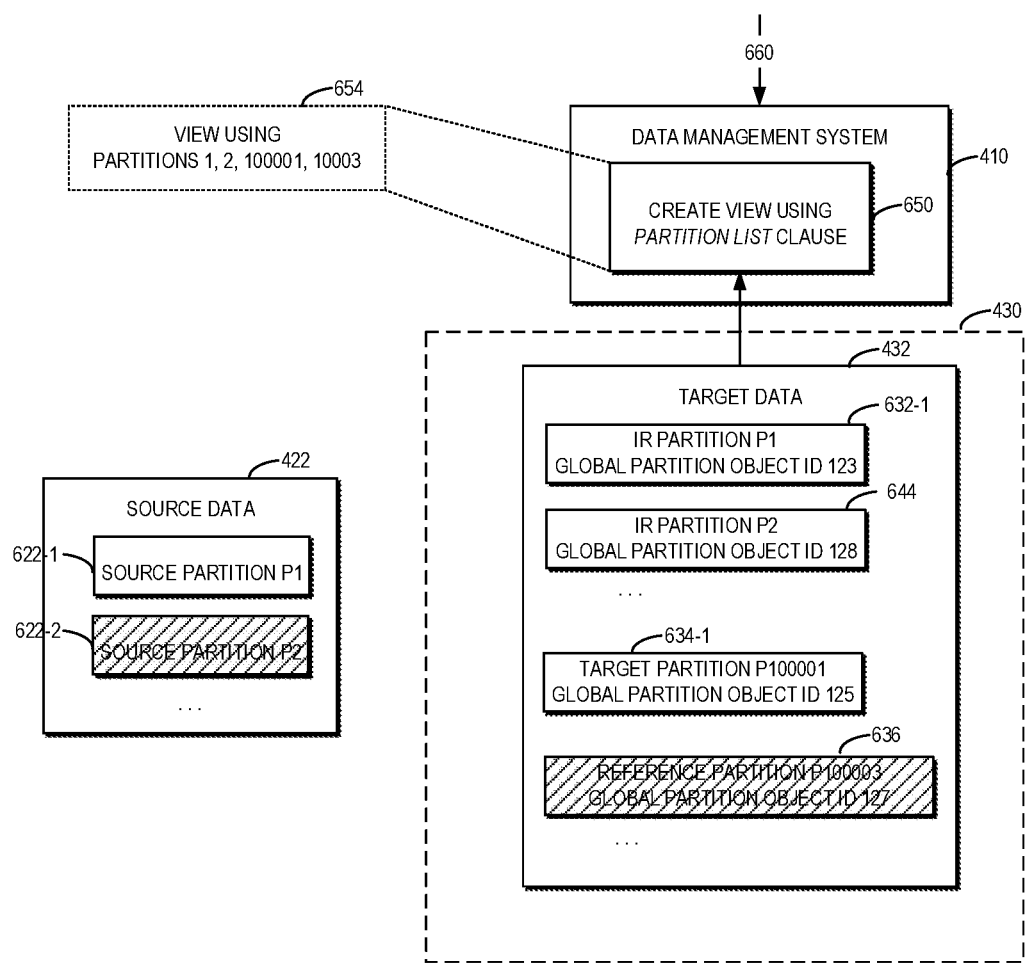

In some embodiments, if there is no such pending execution plan, the data management system 410 may delete the copy 642 of the IR partition 632-2 and the copy 646 of the target partition 634-2. During the deletion of the IR partition 632-2 and the target partition 634-2, the access to the target data 432 can be executed without performance degradation. After the deletion, the target data 432 in the target database 430 may include the IR partition 622-1, the IR partition 644, and the target partition 624-1, and the reference partition 636 which is a new reloaded version for the previous target partition 624-2, as illustrated in FIG. 6D.

In some embodiments, after the reference partition 636 is included to the target data 432, and sometimes after the empty IR partition 644 is attached to the target data 432, from the applications issuing queries to one or more partitions of the target data 432, the partitions of the whole target data 432 may be viewed through a list of its partitions identified with their partition identities. For example, the data management system 410 may create a view using partition list clause 560. A view 654 may be presented with one or more partitions of the target data 432, such as partitions 1, 2, 100001, and/ 100003.

If a query 660 is received and the query 660 involving at least the target partition 634-2 is received, the data management system 410 may direct the query 660 to the latest data corresponding to the target partition 634-2. Specifically, the data management system 410 may generate an execution plan for the second query by identifying the reference partition 636 with the reference partition identity (P100003, 127). The execution plan may be generated as discussed above. The data management system 410 may execute the execution plan to provide a response to the query 660.

Figure 8:
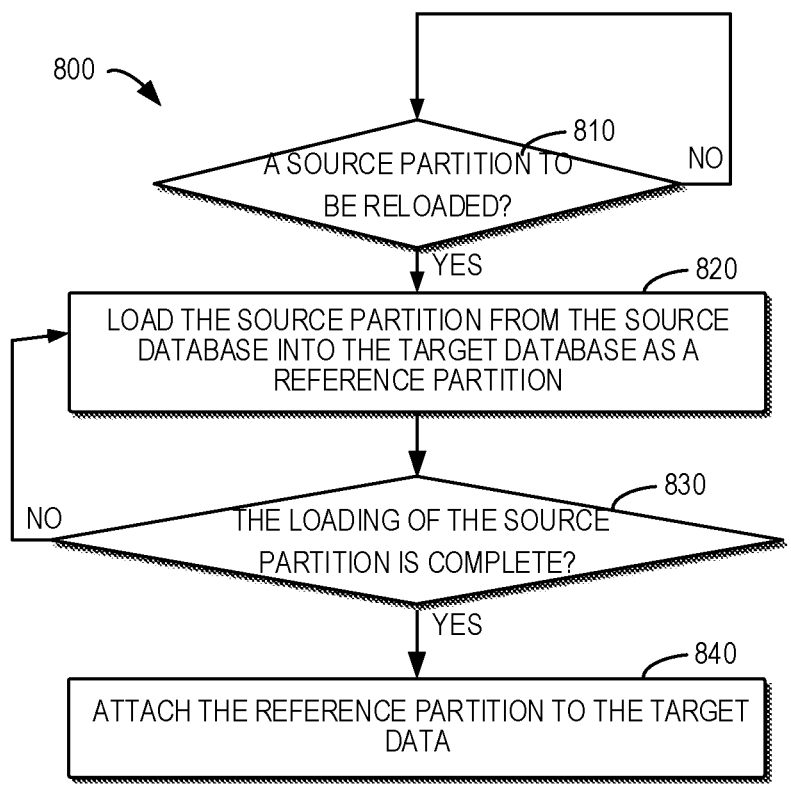
FIG. 8 depicts a flowchart of an example process according to some embodiments of the present disclosure.

FIG. 8 shows a flowchart of an example method 800 according to some embodiments of the present disclosure. The method 800 can be implemented at the database management system 410 of FIG. 4. For the purpose of discussion, the method 800 will be described from the perspective of the database management system 410 with reference to FIGS. 6A-6D.

At block 810, the database management system 410 determines, whether a source partition of source data in a source database is to be reloaded into target data in a target database, the source partition corresponding to a target partition of the target data. If the source partition is to be reloaded, At block 820, the database management system 410 loads the source partition from the source database into the target database as a reference partition, the reference partition being separated from the target data in the target database and being assigned with a reference partition identity. At block 830, the database management system 410 determines whether the loading of the source partition is completed. If the loading of the source partition is no completed, the database management system 410 continues to perform the loading. If the loading of the source partition is completed, at block 840, the database management system 410 attaches the reference partition to the target data.

In some embodiments, in accordance with a determination that a first query to at least the target partition is received during the loading of the source partition, the database management system 410 generates a first execution plan for the first query, the first execution plan identifying the target partition with a target partition identity; and executes the first execution plan to provide a first response to the first query.

In some embodiments, the first execution plan defines a view associated with the target partition by identifying the target partition with the target partition identity.

In some embodiments, the database management system 410 detaches the target partition from the target data, the target partition being stored in the target database and being separated from the target data.

In some embodiments, the database management system 410 determines whether there is a pending execution plan identifying the target partition with the target partition identity; and in accordance with a determination that there is no pending execution plan identifying the target partition with the target partition identity, deletes the target partition from the target database.

In some embodiments, in accordance with a determination that a second query to the target partition is received after the attaching of the reference partition, the database management system 410 generates a second execution plan for the second query, the second execution plan identifying the reference partition with the reference partition identity; and executes the second execution plan to provide a second response to the second query.

In some embodiments, the target data further comprises an incremental replication partition for the target partition, the method further comprising: the database management system 410 detaches the incremental replication partition from the target data, the incremental replication partition being stored in the target database and being separated from the target data; generates an empty incremental replication partition in the target database, the empty incremental replication partition being assigned with a further partition identity; and attaches the empty incremental replication partition to the target data to store incremental data for the reference partition.

In some embodiments, the management system 410 determines whether there is a pending execution plan identifying the incremental replication partition with an incremental replication partition identity; and in accordance with a determination that there is no pending execution plan identifying the incremental replication partition with the incremental replication partition identity, deletes the incremental replication partition from the target database.

It should be noted that the data management system 410 according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Some helpful definitions follow:

Present invention/Present disclosure: should not be taken as an absolute indication that the subject matter described by the term "present invention" or "present disclosure" is covered by either the claims as they are filed, or by the claims that may eventually issue after patent prosecution; while the term is used to help the reader to get a general feel for which disclosures herein that are believed as maybe being new, this understanding, as indicated by use of the term is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   determining whether a source partition of source data in a source database is to be reloaded into target data in a target database, the source partition corresponding to a target partition of the target data;
   in accordance with a determination that the source partition is to be reloaded, loading the source partition from the source database into the target database as a reference partition, the reference partition being separated from the target data in the target database and being assigned with a reference partition identity;
   in accordance with a determination that the loading of the source partition is completed, attaching the reference partition to the target data;
   in accordance with a determination that a first query to the target partition is received after the attaching of the reference partition, generating a first execution plan for the first query, the first execution plan identifying the reference partition with the reference partition identity; and
   executing the first execution plan to provide a first response to the first query.

2. The method of claim 1, further comprising:
   in accordance with a determination that a second query to at least the target partition is received during the loading of the source partition, generating, by one or more processors, a second execution plan for the second query, the second execution plan identifying the target partition with a target partition identity; and
   executing, by one or more processors, the second execution plan to provide a second response to the second query.

3. The method of claim 2, wherein the second execution plan defines a view associated with the target partition by identifying the target partition with the reference partition identity.

4. The method of claim 1, further comprising:
   detaching, by one or more processors, the target partition from the target data, the target partition being stored in the target database and being separated from the target data.

5. The method of claim 4, further comprising:
determining, by one or more processors, whether there is a pending execution plan identifying the target partition with the target partition identity; and
in accordance with a determination that there is no pending execution plan identifying the target partition with the target partition identity, deleting, by one or more processors, the target partition from the target database.

6. The method of claim 1, wherein the target data further comprises an incremental replication partition for the target partition, the method further comprising:
detaching, by one or more processors, the incremental replication partition from the target data, the incremental replication partition being stored in the target database and being separated from the target data;
generating, by one or more processors, an empty incremental replication partition in the target database, the empty incremental replication partition being assigned with a further partition identity; and
attaching, by one or more processors, the empty incremental replication partition to the target data to store incremental data for the reference partition.

7. The method of claim 6, further comprising:
determining, by one or more processors, whether there is a pending execution plan identifying the incremental replication partition with an incremental replication partition identity; and
in accordance with a determination that there is no pending execution plan identifying the incremental replication partition with the incremental replication partition identity, deleting, by one or more processors, the incremental replication partition from the target database.

8. A computer system comprising:
a processing unit; and
a memory coupled to the processing unit and storing instructions thereon, the instructions, when executed by the processing unit, performing acts comprising:
determining whether a source partition of source data in a source database is to be reloaded into target data in a target database, the source partition corresponding to a target partition of the target data;
in accordance with a determination that the source partition is to be reloaded, loading the source partition from the source database into the target database as a reference partition, the reference partition being separated from the target data in the target database and being assigned with a reference partition identity;
in accordance with a determination that the loading of the source partition is completed, attaching the reference partition to the target data;
in accordance with a determination that a first query to the target partition is received after the attaching of the reference partition, generating a first execution plan for the first query, the first execution plan identifying the reference partition with the reference partition identity; and
executing the first execution plan to provide a first response to the first query.

9. The computer system of claim 8, wherein the acts further comprise:
in accordance with a determination that a second query to at least the target partition is received during the loading of the source partition, generating, by one or more processors, a second execution plan for the second query, the second execution plan identifying the target partition with a target partition identity; and
executing, by one or more processors, the second execution plan to provide a second response to the second query.

10. The computer system of claim 8, wherein the first execution plan defines a view associated with the target partition by identifying the target partition with the reference partition identity.

11. The computer system of claim 8, wherein the acts further comprise:
detaching the target partition from the target data, the target partition being stored in the target database and being separated from the target data.

12. The computer system of claim 11, wherein the acts further comprise:
determining whether there is a pending execution plan identifying the target partition with the target partition identity; and
in accordance with a determination that there is no pending execution plan identifying the target partition with the target partition identity, deleting the target partition from the target database.

13. The computer system of claim 8, wherein the target data further comprises an incremental replication partition for the target partition, the acts further comprising:
detaching the incremental replication partition from the target data, the incremental replication partition being stored in the target database and being separated from the target data;
generating an empty incremental replication partition in the target database, the empty incremental replication partition being assigned with a further partition identity; and
attaching the empty incremental replication partition into the target data to store incremental data for the reference partition.

14. A computer program product comprising a computer-readable storage medium having a set of instructions stored therein which, when executed by a processor, causes the processor to perform acts comprising:
determining whether a source partition of source data in a source database is to be reloaded into target data in a target database, the source partition corresponding to a target partition of the target data;
in accordance with a determination that the source partition is to be reloaded, loading the source partition from the source database into the target database as a reference partition, the reference partition being separated from the target data in the target database and being assigned with a reference partition identity;
in accordance with a determination that the loading of the source partition is completed, attaching the reference partition to the target data;
in accordance with a determination that a first query to the target partition is received after the attaching of the reference partition, generating a first execution plan for the first query, the first execution plan identifying the reference partition with the reference partition identity; and
executing the first execution plan to provide a first response to the first query.

15. The computer program product of claim 14, wherein the acts further comprise:
in accordance with a determination that a second query to at least the target partition is received during the loading of the source partition, generating a second execution plan for the second query, the second execution plan identifying the target partition with a target partition identity; and executing the second execution plan to provide a second response to the second query.

16. The computer program product of claim 14, wherein the acts further comprise:

detaching the target partition from the target data, the target partition being stored in the target database and being separated from the target data.

17. The computer program product of claim 14, wherein the target data further comprises an incremental replication partition for the target partition, the acts further comprising:

detaching the incremental replication partition from the target data, the incremental replication partition being stored in the target database and being separated from the target data;

generating an empty incremental replication partition in the target database, the empty incremental replication partition being assigned with a further partition identity; and attaching the empty incremental replication partition into the target data to store incremental data for the reference partition.

18. The computer system of claim 8, wherein the acts further comprise:

determining whether there is a pending execution plan identifying the incremental replication partition with an incremental replication partition identity; and in accordance with a determination that there is no pending execution plan identifying the incremental replication partition with the incremental replication partition identity, deleting the incremental replication partition from the target database.

19. The computer program product of claim 14, wherein the acts further comprise:

determining whether there is a pending execution plan identifying the incremental replication partition with an incremental replication partition identity; and in accordance with a determination that there is no pending execution plan identifying the incremental replication partition with the incremental replication partition identity, deleting the incremental replication partition from the target database.

20. The computer program product of claim 14, wherein the first execution plan defines a view associated with the target partition by identifying the target partition with the reference partition identity.

* * * * *